(12) United States Patent
Dharmapurikar et al.

(10) Patent No.: US 8,056,088 B1
(45) Date of Patent: Nov. 8, 2011

(54) USING SCAN CHAINS FOR CONTEXT SWITCHING

(75) Inventors: Makarand M. Dharmapurikar, Santa Clara, CA (US); John A. Robinson, Cupertino, CA (US); Andrew J. Tao, San Francisco, CA (US)

(73) Assignee: NVIDIA Corporation, Santa Clara, CA (US)

(*) Notice: Subject to any disclaimer, the term of this patent is extended or adjusted under 35 U.S.C. 154(b) by 1457 days.

(21) Appl. No.: 11/301,517

(22) Filed: Dec. 13, 2005

(51) Int. Cl.
  *G06F 9/46* (2006.01)
  *G06F 7/38* (2006.01)
  *G06F 9/00* (2006.01)
  *G06F 9/44* (2006.01)

(52) U.S. Cl. ..................... 718/108; 712/228

(58) Field of Classification Search .............. 718/108; 712/228; 714/30
See application file for complete search history.

(56) References Cited

U.S. PATENT DOCUMENTS

| | | | | |
|---|---|---|---|---|
| 5,280,616 A | * | 1/1994 | Butler et al. | 718/108 |
| 5,428,779 A | * | 6/1995 | Allegrucci et al. | 718/108 |
| 6,959,407 B2 | * | 10/2005 | Six | 714/726 |
| 7,461,242 B2 | * | 12/2008 | Grossman et al. | 712/228 |
| 2003/0164825 A1 | * | 9/2003 | Baldwin et al. | 345/419 |
| 2007/0136564 A1 | * | 6/2007 | Menon et al. | 712/228 |

* cited by examiner

*Primary Examiner* — Emerson Puente
*Assistant Examiner* — Hiren Patel
(74) *Attorney, Agent, or Firm* — Patterson & Sheridan, LLP

(57) ABSTRACT

The invention sets forth an approach to context switching that utilizes scan chains modified to perform context switching operations. The design requires substantially less additional silicon area and design engineering effort than existing context switch approaches, while operating substantially faster and providing additional debug observability during context switching operations.

8 Claims, 3 Drawing Sheets

USING SCAN CHAINS FOR CONTEXT SWITCHING

BACKGROUND OF THE INVENTION

1. Field of the Invention

Embodiments of the present invention relate generally to the field of computer graphics and more specifically to a technique for using scan chains to perform context switching.

2. Description of the Related Art

Modern computing devices routinely alternate their execution between several or many software programs within a short period of time. This ability to alternately execute several programs allows a user to perform several concurrent tasks on the computing device, such as editing a spreadsheet, downloading a file from the internet, and listening to audio files through a multimedia program, while giving the appearance that each program is executing without interruption. However, the computing device is configured to give this appearance by alternating the computing device's execution between each software program on very short (on the order of milliseconds or microseconds) "processing intervals." This practice is typically referred to as "multiprocessing".

One technical requirement for multiprocessing is that the computing device perform a "context switch" at the beginning and end of each processing interval. A context switch includes saving the current state of the computing device to a secondary location, such as main memory or a secondary memory array, and restoring a previous state of the computing device that had been stored subsequent to a previous context switch. For example, a context switch from spreadsheet execution to multimedia program execution requires saving the computing device state for the spreadsheet execution to a secondary location followed by restoring the computing device state for the multimedia program from a secondary location.

FIG. 1 illustrates a prior art context save/restore capability implemented in a graphics controller 100 using additional state elements and observability logic. In this design, the context save/restore is performed by exchanging state information distributed throughout the graphics controller 100 with a memory controller 140, which subsequently saves/restores that state to/from a graphics memory (not shown) through a graphics memory interface 142. The state of the graphics controller 100 is contained in a plurality of state elements, shown as 101 and 120, although these elements are merely illustrative of the hundreds or thousands of such state elements that may exist in a modern microelectronics device.

As shown, the state element 101 has a preceding logic block 110 and a subsequent logic block 102. A "Q" output 104 of the state element 101 is coupled to an input of the logic block 102 and to a data input of the memory controller 140. An output of the logic block 110 is coupled to a first input 112 of a data selection mux 106, whose output 108 is coupled to a "D" input of the state element 101. A second input 118 to the data selection mux 106 is coupled to a data output of the memory controller 140, and a "select" input 107 to the data selection mux 106 is coupled to a mode select signal 114. Similarly, the state element 120 has a preceding logic block 130 and a subsequent logic block 122. A "Q" output 124 of the state element 120 is coupled to an input of the logic block 122 and to another data input of the memory controller 140. An output of the logic block 130 is coupled to a first input 132 of a data selection mux 126, whose output 128 is coupled to a "D" input of the state element 120. The data selection mux 126 has a second input 138 that is coupled to another data output of the memory controller 140, and a "select" input 127 to the data selection mux 126 is also coupled to the mode select signal 114. A clock signal 116 synchronizes the operation of the state elements 101 and 120.

The first step of a context restore operation requires the memory controller 140 to address and read a plurality of bits (e.g., 32 bits) of stored context from one or more corresponding addresses in the graphics memory. Subsequently, the memory controller 140 decodes that stored context into individual state values to be communicated to the data selection mux of each corresponding state element (e.g. the data selection mux 106, which corresponds to the state element 101). Finally, these values are written into the corresponding state elements on the next cycle of the clock 116. This process of addressing, reading, decoding and subsequently writing the previously stored state is repeated until the entire context switchable state of the graphics controller is restored. Similarly, a context save operation requires the memory controller 140 to address, read and encode state values from one or more state elements and then to write those encoded bits (e.g., 32 bits) as stored context to one or more corresponding addresses in the graphics memory. The process of addressing, reading, encoding and subsequently writing the current state is repeated until the entire context switchable state of the graphics controller is saved.

One disadvantage of this approach to context switching is that capturing the context switch state requires the addition of substantial logic (e.g., the state elements 101 and 120 and the muxes 106 and 126) to the overall design. Additional logic is also added in the form of observability logic in the memory controller 140 to address and then encode/decode the context switch state into data that match the format of the graphics memory. Identifying which context switch state values to save/restore, implementing the additional logic to save/restore the identified state values and verifying the correct functionality of the additional logic requires substantial engineering design effort. Further, the additional logic occupies valuable silicon area in the graphics controller 100. Another disadvantage is that the process of addressing, reading/writing and decoding/encoding data from/to the graphics memory is a slow and iterative process, resulting in slow context switch operations.

As the foregoing illustrates, what is needed in the art is an approach to context switching that avoids one or more of the aforementioned disadvantages.

SUMMARY OF THE INVENTION

One embodiment of the invention sets forth a scan chain configured to perform context switching operations. The scan chain includes a first scanable state element configured to store state information and having a scan input coupled to an output of a memory controller, and a second scanable state element configured to store state information and having a scan output coupled to an input of the memory controller. State information stored in the second scanable state element is transmitted to the memory controller every clock cycle during a context save operation, and state information is transmitted from the memory controller to the first scanable state element every clock cycle during a context restore operation.

One advantage of the disclosed design is that it requires substantially less additional silicon area and design engineering effort than existing context switch approaches, while operating substantially faster and providing additional debug observability during context switching operations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

One should note that the term "scan chain" is used herein to broadly describe any scan chain configuration having scanable state elements that store state variable information. In various configurations, scan chains may or may not include logic blocks that receive their inputs from the scanable state elements. All configurations are within the scope of the invention.

Figure 1:
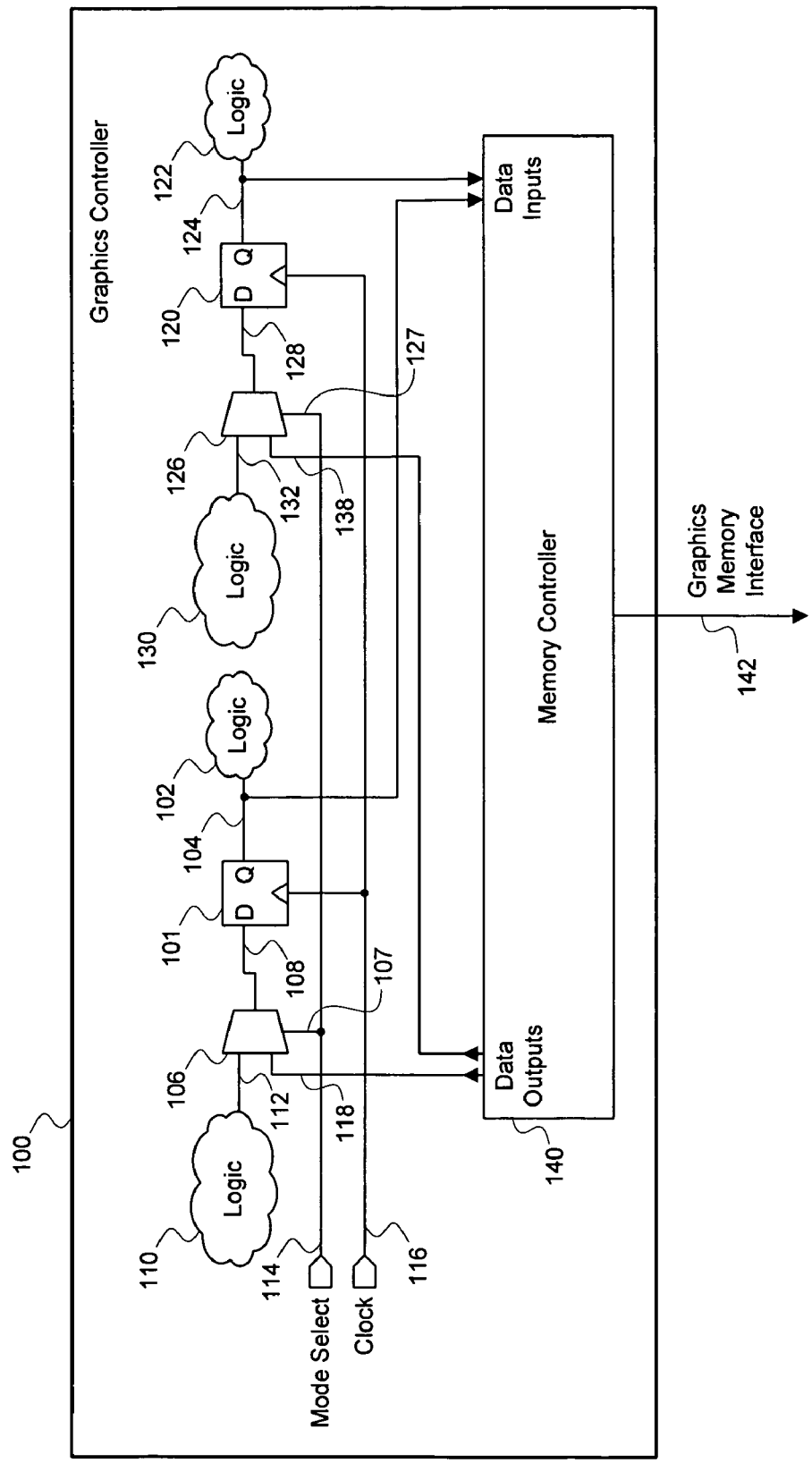
FIG. 1 illustrates prior art context save/restore capability implemented in a graphics controller using additional state elements and observability logic.
Figure 2:
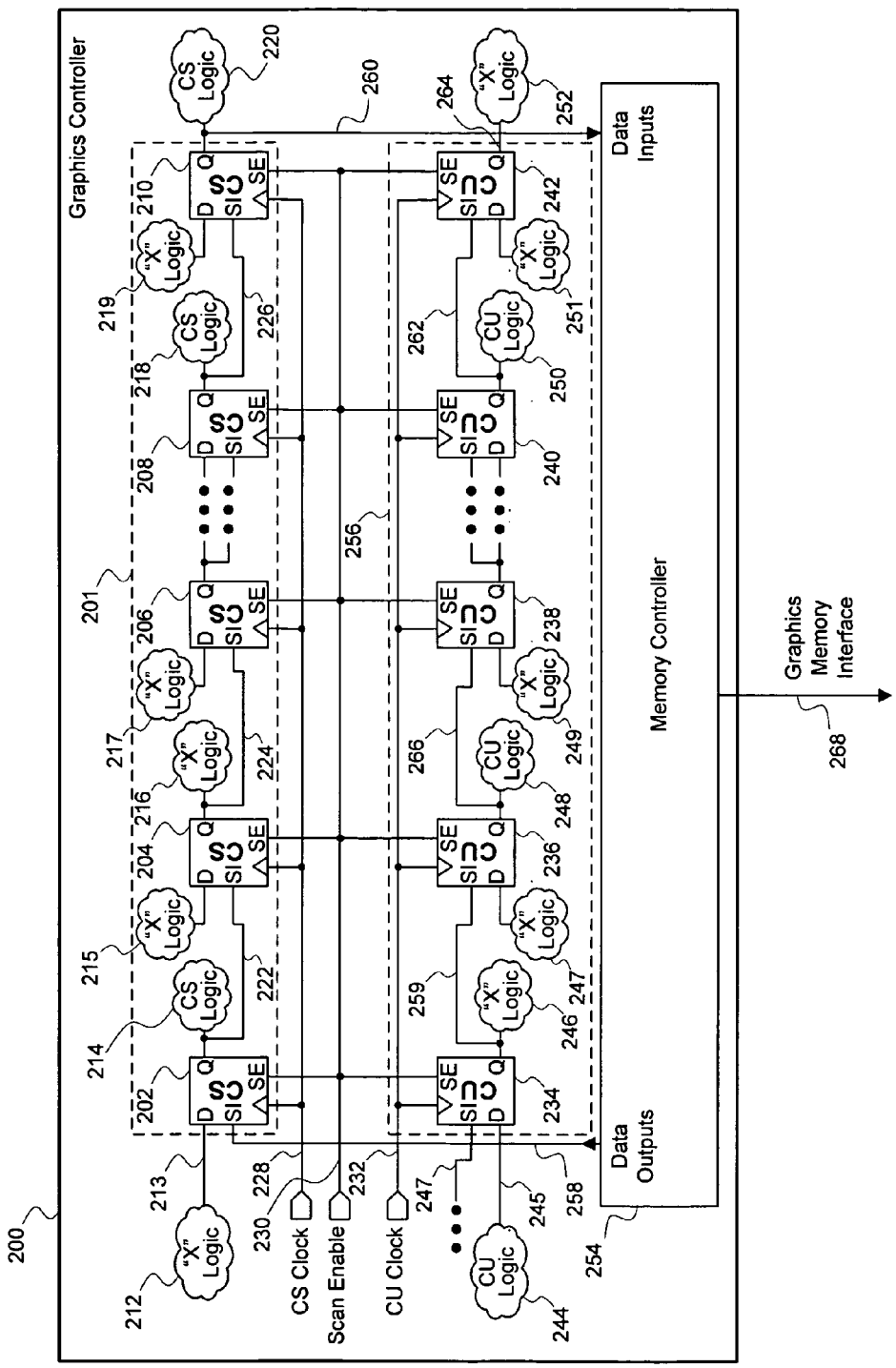
FIG. 2 illustrates a graphics controller with context switch capability implemented using scan chains, according to one embodiment of the invention.

FIG. 2 illustrates a graphics controller 200 with context switch capability implemented using scan chains, according to one embodiment of the invention. As shown, the graphics controller 200 includes, without limitation, a context switched scan chain 201, a context unswitched scan chain 256 and a memory controller 254.

The context switched scan chain 201 includes context switchable ("CS") logic blocks 214, 218 with inputs that are saved/restored during context switch operations, and a "don't care" ("X") logic block 216 with an input that may be saved/restored during context switch operations and X logic blocks 215, 217, 219 with outputs that may be saved/restored during context switch operations, if incorporating the X logic into the context switchable scan chain 201 is advantageous. Those skilled in the art will recognize that X logic may simplify the design process to implement a given logic function. Thus, including the X logic block 216 in the context switched scan chain 201 is potentially beneficial, but by no means necessary. The context switched scan chain 201 further includes a plurality of context switched ("CS") scanable state elements 202, 204, 206, 208 and 210. Each such state element has a data input ("D"), a stored output ("Q"), a scan input ("SI"), a scan enable input ("SE") and a clock input. The operation of a scanable state element is well known to those skilled in the art and therefore is not described in detail herein.

A scan input 258 of the context switched scan chain 201 (which is also a scan input of the state element 202) is coupled to a data output of the memory controller 254. A data input 213 of the context switched chain 201 (which is also a data input of the state element 202) is coupled to the output of a X logic block 212. A stored output 222 of the state element 202 is coupled to the scan input of the state element 204 and to the input of the CS logic block 214. The output of the X logic block 215 is coupled to the data input of the state element 204. A stored output 224 of the state element 204 is coupled to the scan input of the state element 206 and to the input of the X logic block 216. The output of the X logic block 217 is coupled to the data input of the state element 206. Although not shown, the logic between the scanable state element 206 and the scanable state element 208 may include one or more CS or X logic blocks or additional context switched scanable state elements. A stored output 226 of the state element 208 is coupled to the scan input of the of the state element 210 and to the input of the CS logic block 218, whose output is coupled to the data input of the state element 210. A scan output 260 of the context switchable scan chain 201 (which is also a stored output of the state element 210) is coupled to a data input of the of the memory controller 254 and to the input of an X logic block 220.

The context unswitchable scan chain 256 includes context unswitchable ("CU") logic blocks 248, 250 with inputs that may not be altered during context switch operations, an X logic block 246 with an input that may be saved/restored during context switch operations, and X logic blocks 247, 249, 251 with outputs that do not need to be saved/restored during context switch operations, as previously described herein. Examples of context unswitchable logic include memory controller configuration logic (which is involved in storing/retrieving state information during context switch operations) and the logic for controlling context switch operations. The context unswitched scan chain 256 further includes a plurality of context unswitched ("CU") scanable state elements 234, 236, 238, 240 and 242. Again, each such scanable state element has a data input ("D"), a stored output ("Q"), a scan input ("SI"), a scan enable input ("SE") and a clock input.

A scan input 247 of the context unswitched scan chain 256 (which is also a scan input of the state element 234) may be coupled to a preceding logic block (not shown) or to logic that writes the scan input 247 during manufacturing test operations. A data input 245 of the context unswitched chain 256 (which is also a data input of the state element 234) is coupled to the output of a CU logic block 244. A stored output 259 of the state element 234 is coupled to the scan input of the state element 236 and to the input of the X logic block 246, whose output is coupled to the data input of the state element 236. A stored output 266 of the state element 236 is coupled to the scan input of the state element 238 and to the input of the CU logic block 248, whose output is coupled to the data input of the state element 238. Although not shown, the logic between the state element 238 and the state element 240 may include one or more CU or X logic blocks or additional context unswitched scanable state elements. A stored output 262 of the state element 240 is coupled to the scan input of the state element 242 and to the input of the CU logic block 250, whose output is coupled to the data input of the state element 242. A scan output 264 of the context unswitched scan chain 256 (which is also a stored output 264 of the state element 242) may be coupled to an X logic block 252 or to logic (not shown) that reads the scan output 264 during manufacturing test operations.

Importantly, the clock domain of a state element's clock input determines whether the state element is context switched or context unswitched. One or more context switched clock domains and one or more context unswitched clock domains may exist in the design. Coupling a state element's clock input to a context switched clock domain causes that state element to be context switched. Therefore, coupling a CS or X logic block's input to a stored output of a context switched state element causes the CS or X logic block's input to be saved and restored during a context switch operation. Alternatively, coupling a state element's clock input to a context unswitched clock domain causes that state element to be context unswitched. Therefore, coupling a CU or X logic block's input to a stored output of a context unswitched state element prevents the CU or X logic block's input from being corrupted during a context switch operation.

The computing device 200 includes two clock signals, a context switched ("CS") clock 228 and a context unswitched ("CU") clock 232, as well as a scan enable signal 230. During context save and restore operations, the scan enable signal 230 and the CS clock 228 are active, while the CU clock is inactive. Those skilled in the art will readily recognize that this combination of clock and scan enable conditions causes the stored outputs of the state elements in the context switched scan chain 201 to shift right by one position on each cycle of the CS clock 228. Additionally, the data input and data output of the memory controller 254 are updated each cycle of the CS clock 228. During manufacturing test, the scan enable signal 230 is active and the CS clock 228 and the CU clock 232 may both be active, causing the stored outputs of the context switched and context unswitched scan chains 201, 256 to shift right by one position on each cycle of the CS clock 228 and the CU clock 232, respectively. Further, when the graphics controller 200 is not performing a context switch operation and is not being tested, the scan enable signal 230 is inactive and both the CS clock 228 and the CU clock 232 may be active, causing the data input of each state element to update the state element's stored output on each cycle of the CS clock 228 and the CU clock 232, typically referred to as "normal operation."

Importantly, scan chains are a typical component of modern microelectronics devices, often used for manufacturing test purposes and for silicon debug. As previously described herein, in the present invention, these existing scan chains are adapted to perform context switch operations. In particular, the following changes have been made to the scan chains. First, the scan output 260 of the context switched scan chain 201 is coupled to the data input of the memory controller 254. Second, the data output of the memory controller 254 is coupled to the scan input 258 of the scan chain 201. Finally, the scan chains are partitioned such that all inputs to context switchable logic blocks are coupled to stored outputs of state elements in context switched scan chains (e.g., the input to context switchable logic block 214 is coupled to the stored output 222 of the state element 202 in the context switched scan chain 201), while all inputs to context unswitchable logic blocks are coupled to stored outputs of state elements in context unswitched scan chains (e.g. the input to context unswitchable logic block 248 is coupled to the stored output 266 of the state element 236 in context unswitched scan chain 256).

One advantage of the disclosed system is that the amount of additional logic to support context switching is substantially reduced by using existing scan chain scanable memory elements to capture and communicate context switch state. The inventive approach therefore saves valuable space on the silicon used for the graphics controller. Further, the engineering and design effort required to design, implement and verify the context switching functionality of the scan chains is substantially reduced relative to prior art context switching approaches because interconnecting memory elements to form the scan chains may be performed by scan stitch software tools that are common in the industry once designers have partitioned the state elements into context switched and context unswitched scan chains. In addition, the inventive approach eliminates the decoding/encoding steps when writing and reading state information from/to the graphics memory, thereby increasing the speed of context switch operations.

The additional state visibility resulting from using scan chains to perform context saves/restores also may provide further advantages. For example, the additional state information may be used to perform advanced debug operations, such as "soft patching" (i.e., reading internal memory locations, editing their values in external memory and then overwriting the internal values with those stored in external memory), which is not possible with current art.

Other embodiments of the invention are possible without departing from the scope of the invention, including a greater number of scan chains or clock domains, a greater or lesser number of scanable elements or logic blocks, and a different ordering or interconnection of the logic blocks and state elements.

Figure 3:
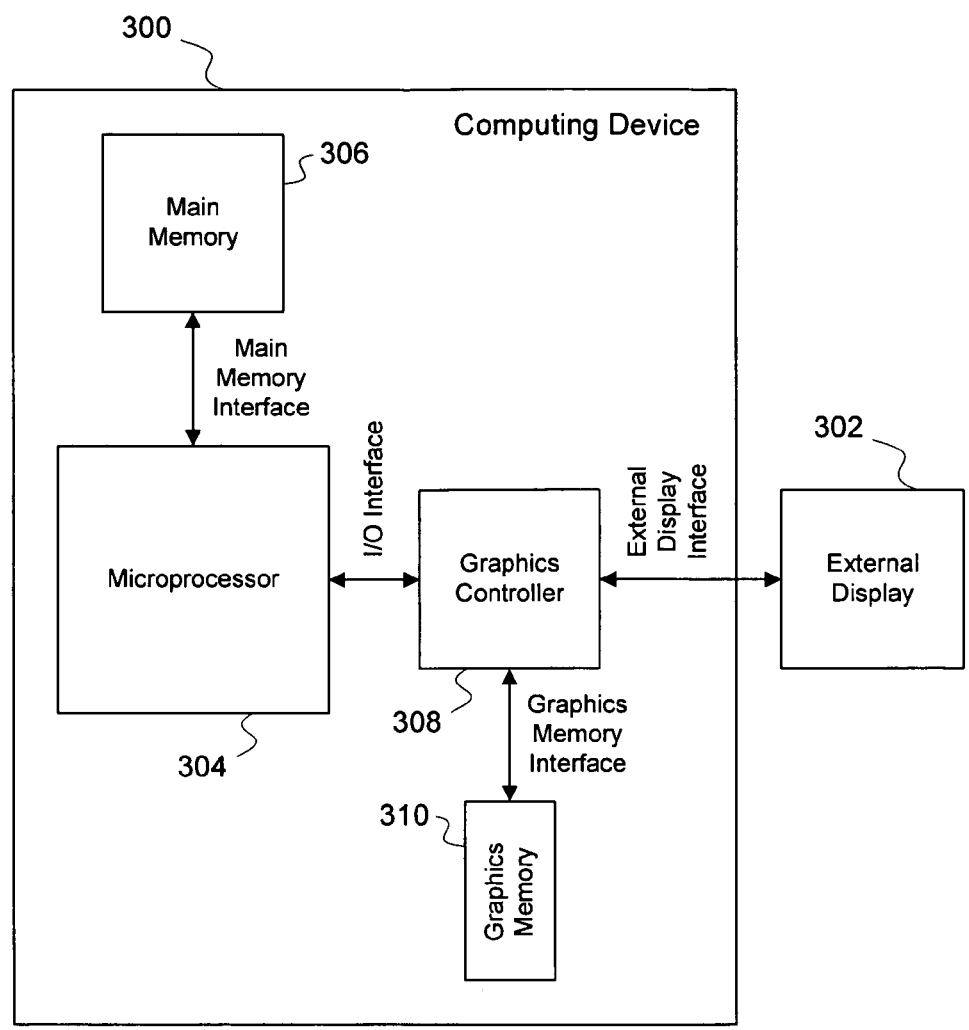
FIG. 3 illustrates a computing device in which one or more aspects of the invention may be implemented.

FIG. 3 illustrates a computing device 300 in which one or more aspects of the invention may be implemented. As shown, the computing device 300 includes a microprocessor 304, a main memory 306, a graphics controller 308 and a graphics memory 310. The graphics controller 308 is coupled to the graphics memory 310 through a graphics memory interface, to the microprocessor 304 through an I/O interface, and to an external display 302 through an external display interface. The graphics controller 308 may be configured with context switch capability implemented using scan chains, as previously described herein. The microprocessor 304 is coupled to the main memory 306 through a main memory interface. Other components may be present in the computing device 300, such as network interface cards, disk controllers, or other devices, that are not shown for the sake of clarity. The computing device 300 may be a desktop computer, server, laptop computer, palm-sized computer, personal digital assistant, tablet computer, game console, cellular telephone, or any other type of similar device that processes information.

While the foregoing is directed to embodiments of the present invention, other and further embodiments of the invention may be devised without departing from the basic scope thereof. Although the present embodiment addresses context switch operations in a graphics controller, the invention may be implemented in any integrated microelectronics device (e.g. microprocessor, microcontroller and singlechip or multichip computing device) as well as any singlechip or multichip dedicated function device (e.g. network interface card, PCI controller or memory device). The scope of the present invention is therefore determined by the claims that follow.

We claim:

1. A plurality of scan chains configured to perform method for context switching operations, the scan chains comprising:
    a first scan chain, wherein the first scan chain includes:
    a first scanable state element coupled to context switchable logic, and configured to store state information and having a scan input coupled to an output of a memory controller;
    a second scanable state element coupled to context switchable logic, and configured to store state information and having a scan output coupled to an input of the memory controller;
    a second scan chain, wherein the second scan chain includes:
    a third scanable state element coupled to context unswitchable logic and configured to store state information;
    a fourth scanable state element coupled to context unswitchable logic and configured to store state information;
    wherein the first scanable state element and the second scanable state element are coupled to a first clock and the third scanable state element and the fourth scanable state element are coupled to a second clock;
    wherein state information stored in the second scanable state element is transmitted to the memory controller every clock cycle during a context save operation, and state information is transmitted from the memory controller to the first scanable state element every clock cycle during a context restore operation;

wherein a scan enable signal is coupled to the first scanable state element, the second scanable state element, the third scanable state element and the fourth scanable state element; and wherein the first clock and the scan enable signal are active and the second clock is inactive during context save and context restore operations.

2. The scan chains of claim 1, wherein the scan enable signal is inactive and the first clock is active during normal system operation, allowing the state information stored in the first scanable state element and the second scanable state element to be updated every clock cycle.

3. A computing device having context switching capability implemented using scan chains, the computing device comprising:

a memory;

an integrated circuit device having a first scan chain and a second scan chain configured to perform context switching operations;

wherein the first scan chain includes:

a first scanable state element coupled to context switchable logic, and configured to store state information and having a scan input coupled to an output of a memory controller;

a second scanable state element coupled to context switchable logic, and configured to store state information and having a scan output coupled to an input of the memory controller;

wherein the second scan chain includes:

a third scanable state element coupled to context unswitchable logic and configured to store state information;

a fourth scanable state element coupled to context unswitchable logic and configured to store state information;

wherein the first scanable state element and the second scanable state element are coupled to a first clock and the third scanable state element and the fourth scanable state element are coupled to a second clock;

wherein state information stored in the second scanable state element is transmitted to the memory controller every clock cycle during a context save operation, and state information is transmitted from the memory controller to the first scanable state element every clock cycle during a context restore operation;

wherein a scan enable signal is coupled to the first scanable state element, the second scanable state element, the third scanable state element and the fourth scanable state element; and wherein the first clock and the scan enable signal are active and the second clock is inactive during context save and context restore operations.

4. The computing device of claim 3, wherein the integrated circuit device is a microprocessor.

5. The computing device of claim 3, wherein the integrated circuit device is a graphics controller.

6. The computing device of claim 3, wherein the integrated circuit device is a dedicated function device.

7. The computing device of claim 3, wherein the scan enable signal is inactive and the first clock is active during normal system operation, allowing the state information stored in the first scanable state element and the second scanable state element to be updated every clock cycle.

8. The computing device of claim 3, wherein the first clock and the second clock are active and the scan enable signal is inactive during normal system operation, allowing state information stored in the first scanable state element, the second scanable state element, the third scanable state element and the fourth scanable state element to be updated every clock cycle.

* * * * *